March 1, 1932.    P. L. SHEE    1,847,140

LOCATING DEVICE

Filed April 6, 1929

Inventor
Parke L. Shee
By N. C. Patterson Att'y

Patented Mar. 1, 1932

1,847,140

UNITED STATES PATENT OFFICE

PARKE LAWTON SHEE, OF BERWYN, ILLINOIS, ASSIGNOR TO WESTERN ELECTRIC COMPANY, INCORPORATED, OF NEW YORK, N. Y., A CORPORATION OF NEW YORK

LOCATING DEVICE

Application filed April 6, 1929. Serial No. 353,040.

This invention relates to locating devices, and more particularly to locating devices for mounting heavy machinery.

In the mounting of heavy machinery, such as punch presses or hydraulic molding presses, it is the practice in some instances to locate the machine accurately and then to bolt it securely to the floor or foundation to prevent lateral vibratory movement thereof. Lateral movement of the machine on its foundation not infrequently results in destruction of pipe connections thereto, such as electrical, steam, water, compressed air, etc. Also, in some instances, it is desirable to secure the bolts interiorly of the base of the machine which complicates the location and securement of the machine whereby considerable time and effort are expended.

The principal object of the invention is the provision of a simple locating device for enabling the easy and rapid installation of heavy machinery.

One embodiment of the invention contemplates the provision of a locating device consisting of a flanged socket placed in the floor where the machine is to be subsequently positioned and having a tapered bore which is adapted to engage a depending tapered plug secured to the base of the machine thus to prevent lateral movement thereof.

It is believed that a complete understanding of the invention can be had from the following description when taken in conjunction with the accompanying drawings, in which Fig. 1 is a fragmentary, central, vertical, sectional view of a locating device positioned in a concrete foundation and shown associated with the base of the machine mounted thereon;

Figure 1:
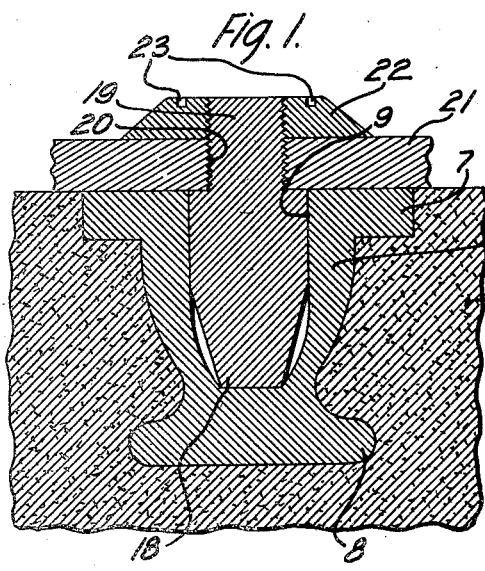

Referring now to the drawings wherein like reference numerals have been employed to designate similar parts throughout the various figures, the numeral 5 designates a socket comprising a cylindrically shaped casting having flanges 7—8 and a machined bore 9. The socket 5 is embedded in a concrete foundation 15 in a desired location with its top surface substantially flush with the upper surface of the foundation. Adapted to engage the walls of the bore 9 is a tapered and shouldered steel plug 18 having a shank 19 threaded through an aperture 20 in a machine base 21. On the upper side of the machine base, a nut or boss 22 is threaded on the shank 19 to secure rigidly the plug 18 to the base. Apertures 23—23 in the top of the boss 22 are provided to permit the use of a spanner wrench to turn the boss in clamping it to the base 21.

In installing a machine by using the locating devices, a template is used to properly position the sockets 5 in the floor. Another template is used for locating the positions of the tapered plugs 18 threaded into the underside of the machine base 21. The sockets are thus previously located in the floor and with the plugs secured to the machine base, the machine is then simply brought into position until the tapered plugs are in alignment with the bores in the sockets, when the machine is lowered so that the tapered plugs are inserted in the sockets whereby the machine is rigidly secured and is prevented from moving laterally.

From the foregoing it will be clear that the locating devices expedite the installation of heavy machinery and also facilitate its moving to any other desired location since the sockets can be set in place prior to the time of moving and the new installation amounts to merely raising, moving and lowering the machine into the new position.

Figure 2:
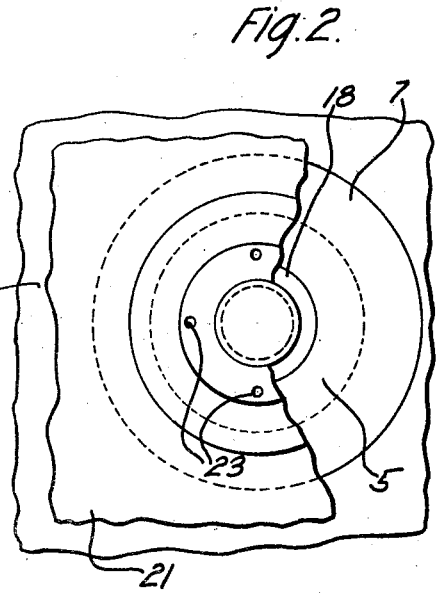
Fig. 2 is a fragmentary, plan view thereof.
Figure 3:
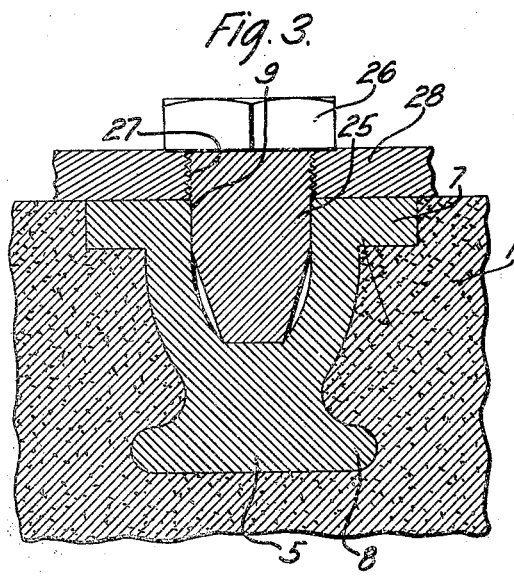
Fig. 3 is a fragmentary, central, vertical, sectional view of a locating device which represents an alternative form of the invention.
Figure 4:
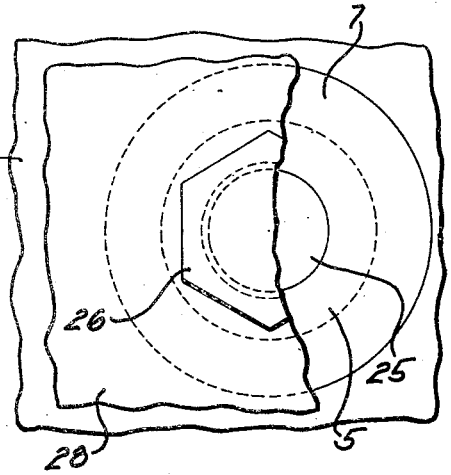
Fig. 4 is a fragmentary, plan view thereof.

Referring to Figs. 3 and 4 where an alternative form of the locating device disclosed in Figs. 1 and 2 is shown, it will be observed that a tapered plug 25 having a hexagonal head 26 is adapted to be threaded from the top through an aperture 27 in a machine base 28 after the machinery has been positioned to bring the apertures in the machine base in alignment with the bores 9 in the sockets 5, hereinbefore described. This arrangement permits the sliding of the machinery into position without raising and lowering the machine and also permits the subsequent insertion of the tapered plugs from the top surface of the machine base rather than previously inserting them in the bottom before moving the machine to its desired location.

It will be understood that the invention herein described and illustrated is capable of many other modifications and applications without departing from the spirit and scope of the invention as defined by the appended claims.

What is claimed is:

1. In a locating device for mounting machinery, a member embedded in the mounting for the machine and having an aperture, and means secured from longitudinal movement relative to the machine base for entering the aperture in the member to prevent lateral movement of the machine.

2. In a locating device for mounting machinery, a member embedded in the mounting for the machine and having an aperture, and means threaded into the machine base for entering the aperture in the member to prevent lateral movement of the machine.

3. In a locating device, a socket member embedded in the mounting for an element to be located, and a plug secured from longitudinal movement relative to the element and having a tapered portion for engaging the socket in the member.

4. In a locating device for mounting machinery, an irregularly shaped casting having an aperture and embedded in the mounting for the machine with an outer surface substantially flush with the surface of the mounting, a member secured to the machine for entering the aperture in the casting to position the machine properly and to prevent lateral movement thereof.

5. In a locating device for mounting machinery, a bored member having a flange embedded in the mounting for the machine, a tapered plug threaded into the base of the machine for entering the bore in the member to secure the machine rigidly in a predetermined location.

6. In a locating device for mounting machinery, a bored member having a plurality of flanges and embedded in the mounting with the top surface of the member flush with the surface of the mounting, and a tapered plug threaded into the base of the machine for entering the bore in the member to secure the machine against lateral movement.

7. A locating device comprising bored means embedded in a mounting for an element to be located, and a shouldered member threaded at one diameter into the element and another diameter entered in the bore of the means to hold the element in a predetermined location.

In witness whereof, I hereunto subscribe my name this 25th day of March, A. D., 1929.

PARKE LAWTON SHEE.